United States Patent
Meninger et al.

(10) Patent No.: US 9,041,432 B2
(45) Date of Patent: May 26, 2015

(54) CLOCK MULTIPLEXING AND REPEATER NETWORK

(71) Applicant: Cavium, Inc., San Jose, CA (US)

(72) Inventors: Scott Meninger, Groton, MA (US); Rohan Arora, Marlborough, MA (US)

(73) Assignee: Cavium, Inc., San Jose, CA (US)

( * ) Notice: Subject to any disclaimer, the term of this patent is extended or adjusted under 35 U.S.C. 154(b) by 0 days.

(21) Appl. No.: 14/041,961

(22) Filed: Sep. 30, 2013

(65) Prior Publication Data

US 2015/0091623 A1   Apr. 2, 2015

(51) Int. Cl.
*G06F 1/08* (2006.01)
*G06F 1/06* (2006.01)
*H03L 7/08* (2006.01)

(52) U.S. Cl.
CPC ... *G06F 1/06* (2013.01); *H03L 7/08* (2013.01)

(58) Field of Classification Search
USPC .................................... 327/99, 293, 295–297
See application file for complete search history.

(56) References Cited

U.S. PATENT DOCUMENTS 8,464,088 B1 * 6/2013 Nguyen et al. ................ 713/500

* cited by examiner

*Primary Examiner* — William Hernandez
(74) *Attorney, Agent, or Firm* — Hamilton, Brook, Smith & Reynolds, P.C.

(57) ABSTRACT

A system on chip (SOC) includes a clock generator to provide one or more on-chip reference clocks to a number of physical medium attachments (PMAs) across a common clock bus. The clock generator receives one or more external, off-chip clock lines, from which it generates the on-chip reference clocks. Each of the PMAs may operate data input/output (I/O) channels under a variety of different communications protocols, which can have common or distinct reference clock frequencies. Accordingly, the on-chip reference clocks are generated to provide the required reference clocks to each of the PMAs.

25 Claims, 8 Drawing Sheets

CLOCK MULTIPLEXING AND REPEATER NETWORK

BACKGROUND

A system on chip (SOC) is an integrated circuit that integrates several components of a computer system into a single semiconductor chip. The SOC may be a component of a larger computer system or network, and can be supported by a printed circuit board (PCB) connecting the SOC to other circuit components and communications channels. Often, in working with complex SOCs, it is necessary to provide the input/output interfaces (I/Os) with reference clocks that are used to establish a timing base for generation of internal clocks used to transmit and receive data. A single SOC may interface with several different communications protocols, each of which may require different reference clock frequencies. In typical SOCs, these reference clock signals are generated off-chip and provided to the IOs through buffered channels on the supporting PCB.

SUMMARY

In example embodiments of the invention, an integrated circuit, such as a system on chip (SOC), may include a clock generator, a plurality of physical medium attachments (PMAs), and a plurality of multiplexors and repeaters. The clock generator may be connected to one or more clock lines external to the integrated circuit, receiving one or more external clock signals via the clock lines. The clock generator may further transmit a plurality of reference clock signals across a bus at the integrated circuit. The PMAs may interface with a respective input/output (I/O) channel external to the integrated circuit. The multiplexers may be connected to the bus, and each multiplexer may select among at least a subset of the plurality of reference clock signals to forward to at least one of the PMAs. The repeaters may be connected to buffer one of the plurality of reference clock signals to be forwarded to at least one of the multiplexers.

In further embodiments, the clock generator may generate the reference clock signals based on the received external clock signals. The clock generator may include at least one buffer connected to buffer the external clock signals to generate the plurality of reference clock signals. At least one of the reference clock signals may have a frequency distinct from another of the reference clock signals or the frequency of an external clock signal. The clock generator may further include one or more phase-locked loops (PLLs) connected to receive the at least one external clock signal. The PLL may generate at least one of the reference clock signals to have a frequency distinct from that of external clock signals. For example, the PLL may generate a reference clock signal at a frequency that is an integer or fractional multiple of that of an external clock signal.

In still further embodiments, each of the PMAs may be configured to clock data signals at the respective input and output channel using at least one of the reference clock signals. Each of the PMAs may also interface with a respective physical coding sublayer (PCS) with at least one of the plurality of reference clock signals.

In yet still further embodiments, the clock generator may generate the reference clock signals according to communications protocols implemented at each of the of PMAs. The PMAs may also be arranged, per an IC layout, in parallel along the bus, and the multiplexers may be positioned between them.

In further embodiments, a method of providing reference clocks at an integrated circuit may include first receiving, at the integrated circuit, at least one clock signal from a clock line external to the integrated circuit. A plurality of reference clock signals may be transmitted across a bus internal to the IC, where the reference clock signals are based on the at least one external clock signal. One or more of the reference clock signals may then be selected (e.g., from a subset of the reference clock signals) to forward to one or more PMAs at the integrated circuit. The reference clocks may be buffered (e.g., via a repeater) for forwarding to a subsequent PMA. The PMAs may be configured to interface with a respective input and output channel external to the integrated circuit.

In further embodiments, the plurality of reference clock signals may be generated based on the at least one external clock signal, which may include buffering the external clock signal to create the reference clock signal. The reference clock signal may be generated at a frequency distinct from another of the reference clock signals or from an external clock signal. For example, a PLL at the integrated circuit may be controlled to generate a reference clock signal at a frequency distinct from that of an external clock signal, such as an integer or fractional multiple of the external clock signal.

In still further embodiments, at one or more of the PMAs, data signals may be clocked at the respective input and output channel with at least one of the reference clock signals. The PMAs may be configured to interface with respective physical coding sublayers (PCSs) using at least one of the reference clock signals. The reference clock signals can be generated according to the communications protocols used by each of the PMAs. The PMAs may further be arranged in parallel along the bus, and the multiplexers may be positioned between them.

In yet still further embodiments, an integrated circuit may include a clock bus, a clock generator, and a plurality of multiplexers. The clock generator may be connected to a clock line external to the integrated circuit, and may receive an external clock signal at the at least one clock line. The clock generator may further generate, from the external clock signal, a plurality of reference clock signals having frequencies distinct from that of the external clock signal, and may transmit the plurality of reference clock signals across the clock bus. A plurality of multiplexers may be connected to the bus and at least one respective physical medium attachment (PMA). The plurality of multiplexers may each be configured to select among at least a subset of the reference clock signals to forward to the respective PMA.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
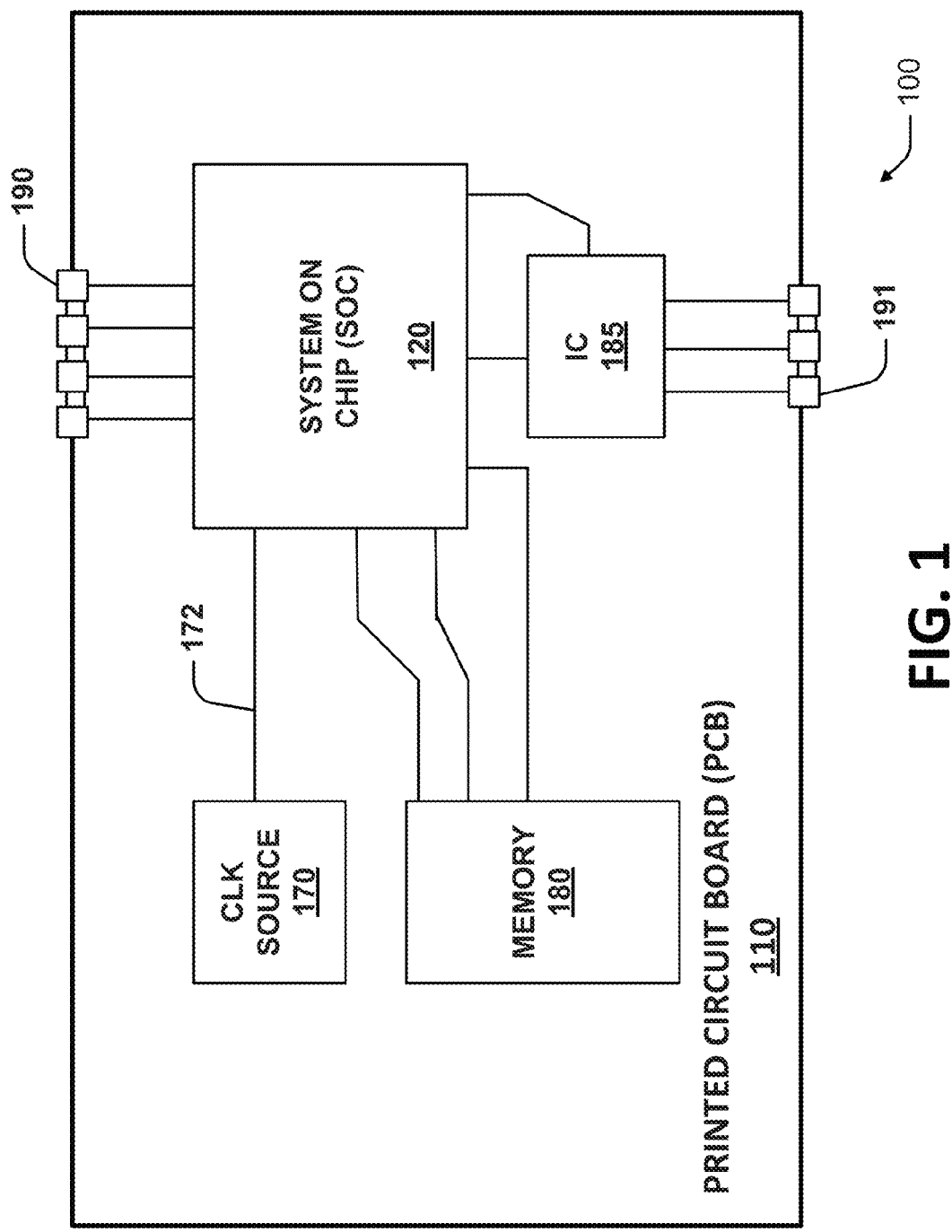
FIG. 1 is a block diagram of a computer system in which embodiments of the invention may be implemented.

FIG. 1 is a block diagram of a computer system 100 on a printed circuit board (PCB) 110. The system 100 may be a component of a larger computer system; for example, the PCB 110 may connect to additional elements or a backplane or other computer bus. The PCB 110 may support and electrically connect a number of components of the system 100, including a system-on-chip (SOC) 120, a clock source 170, a memory device (e.g. a DRAM) 180, and an integrated circuit (IC) (e.g., a microcontroller) 185. The SOC 120 may be configured to interface with on-board circuitry (e.g., IC 185) or external circuitry (e.g., via ports 190, 191) via several different communications protocols. In order to accommodate such protocols, the clock source 170 may provide one or more reference clock signals to the SOC 120 via a clock bus 172. In further embodiments, the system 100 may include more or fewer components, such as SOCs, microcontrollers, analog circuit components, and ports, configured as required for a given application.

Example embodiments of the SOC 120 are described in further detail below with reference to FIGS. 2-8.

Figure 2:
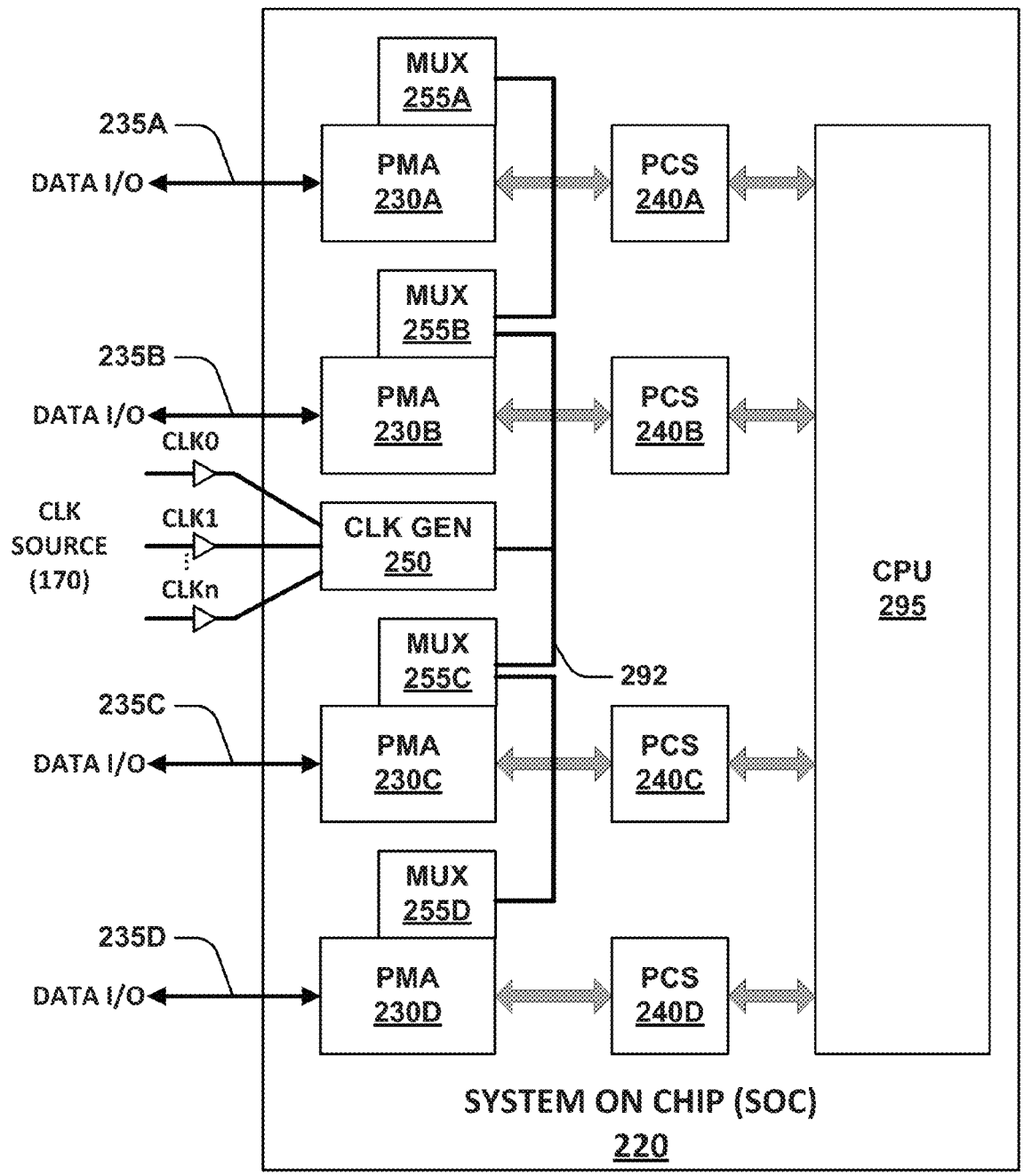
FIG. 2 is a block diagram of a system-on-chip (SOC) implementing an embodiment of the invention.

FIG. 2 is a block diagram of a system-on-chip (SOC) 220 in one embodiment. The components of the SOC 220 as shown may be only a portion of the entire SOC 220, which may include several other components as understood in the art. The SOC 220 may be configured, for example, as a component of a computer system 100 described above with reference to FIG. 1, and may communicate with external elements across a number of different communications protocols. To enable such communications, the SOC 220 may include a plurality of physical medium attachment layers (PMAs) 230A-D, each of which communicate with off-chip elements (e.g., microcontrollers, network or data nodes) via respective data channels 235A-D supported by the underlying PCB (e.g., PCB 110 in FIG. 1). The PMAs 230A-D together provide an interface for such external communications, performing initial and terminal processing (e.g., PMA framing, octet synchronization/detection, scrambling and descrambling) of ingress and egress communications under the respective protocols. Each PMA 230A-D further communicates with a respective physical coding sublayers (PCSs) 240A-D, each of which may perform further processing such as autonegotiation and coding on ingress and egress communications. Each PCS 240A-D, in turn, communicates with the CPU 295, optionally via additional physical sublayers (not shown). The CPU 295 may provide final processing of received communications and forward responsive communications to the PCSs 240A-D for output by the PMAs 230A-D. Further embodiments may implement more or fewer PMAs, PCSs and CPUs.

Each of the PMAs 230A-D may be configured to operate under one or more different communications protocols. In order to generate internal clocking to send and receive communications under these protocols, each PMA 230A-D may require receiving one or more reference clock signals. When communicating under a particular communications protocol, the respective reference clock frequency used by a given PMA may depend on how the PMA is configured, as well as the specific implementation of the protocol. Table 1, below, lists common serial communications standards and the respective reference clock frequencies that are either required or are generally accepted for use in their implementation:

TABLE 1

| Protocol | Ref Clock Frequencies (MHz) |
| --- | --- |
| PCI Express | 100, 125 |
| XAUI (802.3 ae) | 125, 156.25, 312.5 |
| SGMII | 100, 125 |
| Serial Rapid IO | 100, 125, 156.25 |
| InterLaken | 100, 125, 156.25 |
| IEEE 10G-BaseKR | 156.25 |
| XFI | 156.25 |
| IEEE 1000-BaseBX | 125, 156.25 |
| IEEE 10G-BaseKX | 125, 156.25 |
| OIF CEI-6G | 100, 125, 156.25, 312.5 |
| CPRI | 122.88 |
| OIF CEI-11G | 100, 125, 156.25 |
| OIF CEI-25G | 100, 125, 200, 250, 500 |

As shown in Table 1, several of the protocols may share common reference clock frequencies, while others do not. Some protocols allow a for a number of different data rates, and thus the particular reference clock frequency chosen for a given protocol may depend on the selected data rate. A SOC may be configured to communicate under several of the protocols listed in Table 1, as well as other protocols not shown. Thus, depending on the particular protocols operated by an SOC, it may be possible to share reference clocks among two or more PMAs operating under different protocols, provided that the specifications for the most restrictive protocol are utilized.

In typical SOCs, each of the PMAs may accept a reference clock input from the PCB. As indicated above, depending on the particular protocol each PMA is configured to support, the reference clock frequencies may be different across the PMAs, resulting in the possibility that separate reference clocks are supplied to each PMA independently. Conversely, if some of the PMAs are configured for the same protocol or different protocols having the same reference clock frequency, the clock sources producing several of the clocks may originate at the same node. However, each of the PMAs may still require separate reference clock channels to the SOC in order for each reference clock to be appropriately isolated and buffered. Providing each of the PMAs of a SOC with an individual, buffered, off-chip reference clock line can be is costly in terms of circuit components, reliability, and PCB real estate.

One approach to reducing the number of external reference clock lines to the SOC is to share a common, on-chip reference clock with multiple PMAs that require the same reference clock frequency. Such a configuration can be accomplished by implementing additional on-chip components, such as a clock bus, a clock buffer, and one or more multiplexer stages. The clock buffer may accept a single external reference clock to be used as the "common" reference, which the clock buffer propagates through the clock bus. The one or more multiplexers, which may connect between the clock bus and some or all of the PMAs, may select between the common reference clock provided to all PMAs, and an individual clock provided separately to each PMA. Such a configuration reduces the number of PCB buffers by the number of PMAs that share the same reference clock frequency requirement.

However, the above approach may have a number of drawbacks. For example, when a SOC includes many PMAs operating with different reference clock frequencies, this approach does little to reduce the number of off-chip buffered clock lines. Further, distribution of the common clock from the point of its origin (e.g., a clock buffer) to the PMAs becomes more difficult as the PMAs grow in number and the physical distance between the PMA and the origin increases. Power dissipation can become detrimental when distributing clocks over a great distance, and managing clocks from a common block point of origin requires a scheme that is scalable.

Example embodiments of the invention may implement a flexible, on-chip clock network in an integrated circuit to provide required reference clocks to multiple IOs, such as PMAs. Through such an implementation, the number of external clock connections can be minimized, simplifying the PCB layout, reducing materials cost, and improving reliability. Further, the clock network can be implemented into the integrated circuit without requiring substantial additional area in the IC layout.

With reference to FIG. 2, the SOC 220 may implement an on-chip network comprising a clock generator 250, a clock bus 292, and a plurality of multiplexer/repeater (MUX) blocks 255A-D. The clock generator 250 may accept a number of external clock inputs (CLK0-CLKn) from an external clock source (e.g., clock source 170) as are required to meet the overlapping requirements of the SOC 220. The clock generator 250 may then translate and buffer the clock inputs as required to generate corresponding on-chip clock signals, which are forwarded to the MUX blocks 255A-D via the clock bus 292. If several communications protocols such as those of Table 1, above, are implemented by the PMAs 230A-D, those protocols may be met with external clock inputs numbering fewer than the number of protocols. For example, depending of the selected data rates for those protocols, external clocks of 100 MHz, 156.25 MHz and 125 MHz may satisfy the reference clock requirements of a majority of the protocols. As a result, the number of external clock lines and off-chip buffers to the SOC 220 is reduced, thereby simplifying the PCB routing supporting the SOC 220.

By eliminating the need for external per-PMA reference clock signals, the system benefits from the reduced number of off-chip buffers and PCB routing. Also, because external reference clocks often must be terminated with resistors on the PCB, or AC-coupled, those components can be minimized as well. Another advantage this approach offers is a potential savings in IC design, as per-PMA reference clock pins do not need to be brought out of the IC package. Therefore, the IC pinout can be simplified as well as routing to the chip at the PCB level.

Figure 3:
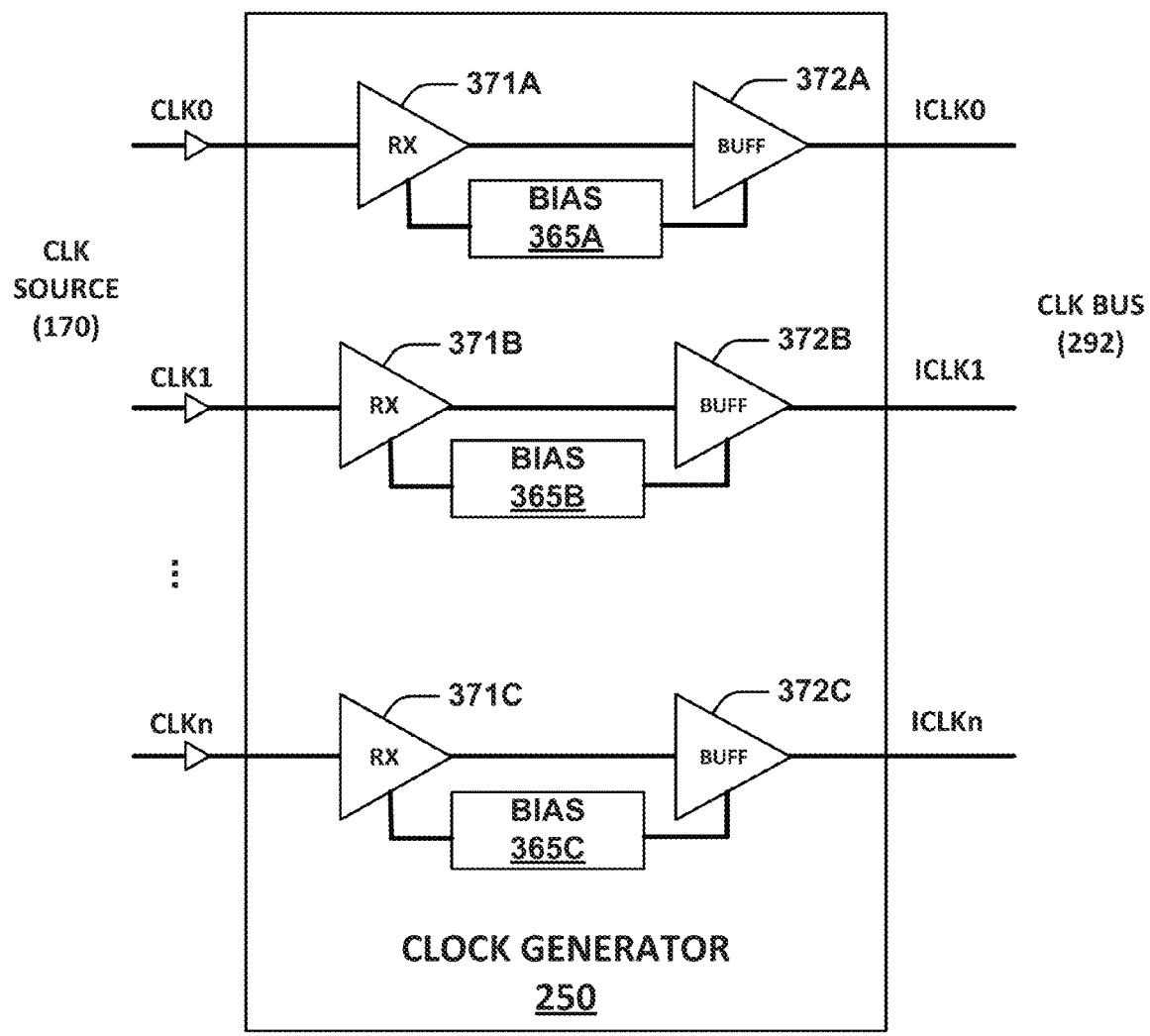
FIG. 3 is a circuit diagram of a clock generator circuit in one embodiment.

FIG. 3 is a circuit diagram of a clock generator 250 circuit in one embodiment, which may be implemented in the SOC 220 of FIG. 2. The clock generator 250 may accept the external clock signals CLK0-CLKn in parallel, generating respective on-chip reference clocks ICLK0-ICLKn for propagation on the clock bus 292. In particular, each external clock signal CLK0-CLKn may be received to a respective receiver amplifier 371A-C, from which it is forwarded to a respective buffer 372A-C, which outputs the corresponding reference clocks ICLK0-ICLKn. The outputs of the receiver amplifiers 371A-C and buffers 372A0C may be controlled by respective bias circuits 365A-C (or alternatively, a single, common bias circuit). The on-chip reference clocks ICLK0-n may share characteristics with their respective off-chip clock signals CLK0-n, such as frequency and waveform, but may adapted to a voltage required for transmission across the internal clock bus 292.

Figure 4:
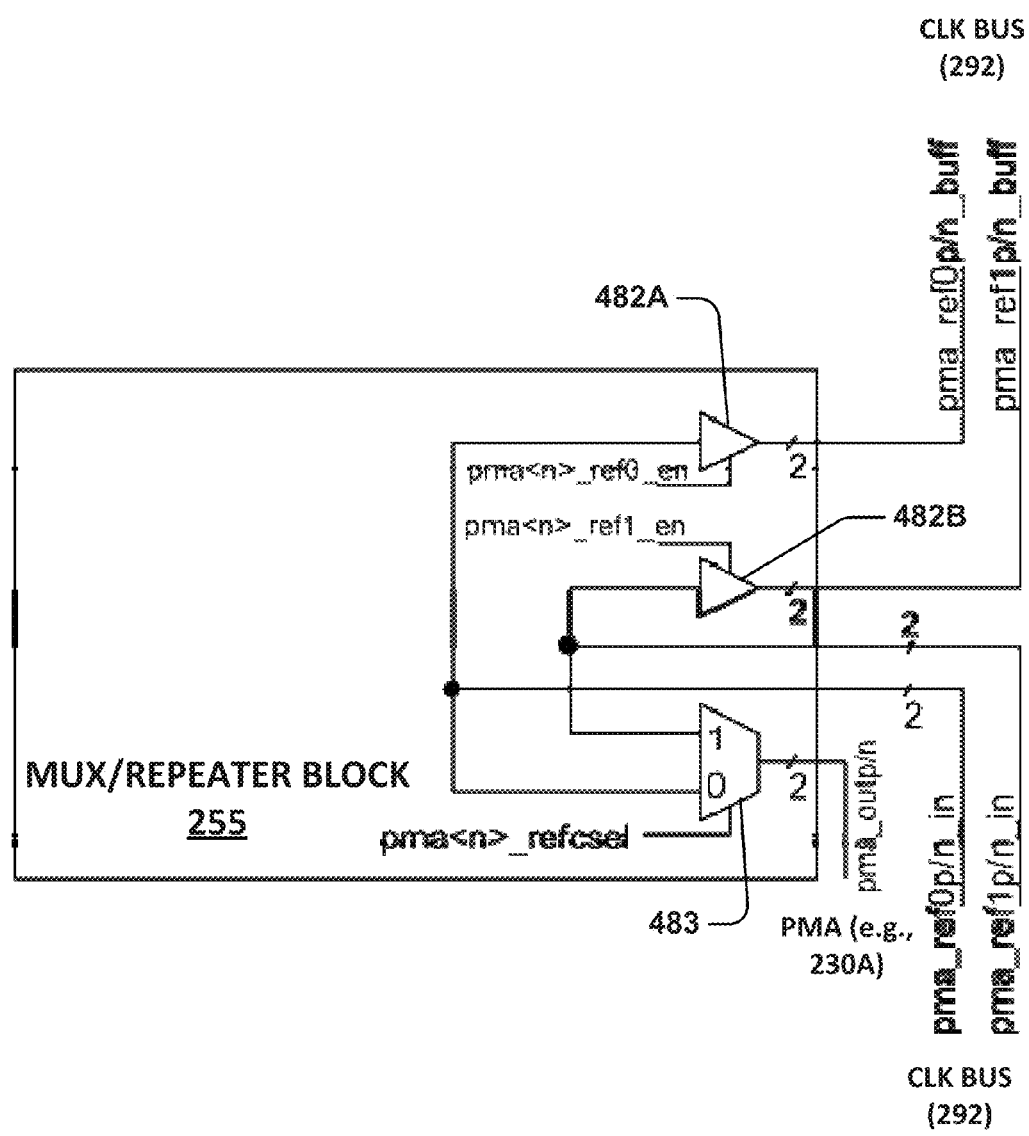
FIG. 4 is a circuit diagram of a multiplexer and repeater block in one embodiment.

FIG. 4 is a circuit diagram of a multiplexer and repeater (MUX) block 255 in one embodiment, which may be implemented in the SOC 220 of FIG. 2 (e.g., as the MUX blocks 255A-D). The MUX block 255 may be connected to one or more PMAs (e.g., PMAs 230A-D) and the clock bus (e.g., clock bus 292), and provides the connected PMA(s) with a selected one of the reference clock signals from the clock bus. The MUX block 255 also provides for receiving the reference clocks from the clock source (e.g., clock generator 250) or another MUX block and repeating the reference clocks out to another MUX block. In this respect, the clock bus may be viewed as a series of serial link segments between multiple MUX blocks, where the reference clocks are received and repeated at each MUX block.

To provide the above functions, the MUX block 255 may include a multiplexer 483, which is configured to receive as inputs each of the reference clocks ("pma_ref0/p/n_in," "pma_ref1/p/n_in"), and is controlled by the associated PMA (via control signal "pma<n>_refsel") to output a selected one of the reference clock signals ("pma_outp/n") to the PMA. The MUX block 255 in this example embodiment employs reference clocks as differential signals. The p/n notation is a signal convention denoting differential signals where "p" means the positive polarity half of the differential pair and "n" the negative polarity half of the differential pair. Further embodiments may employ other signaling conventions as understood in the art. The MUX block also includes buffers 482A-B, which receive the input reference clocks in parallel to the multiplexer 483 and output buffered reference clocks ("pma_ref0p/n buff," "pma_ref1p/n buff"), thereby repeating the reference clocks for propagation to a subsequent MUX block. In order to save power in systems where it is known that a given reference clock is not needed past a certain point, along the clock bus, a respective buffer can be disabled. This may be especially beneficial when many PMAs are employed in a SOC, requiring a large number of repeaters.

In further embodiments, the MUX block 255 may be configured to multiplex and repeat more than two different reference clocks, for example by including an additional number of buffers 482A-B and expanding the multiplexer 482 to accommodate additional inputs.

Figure 5:
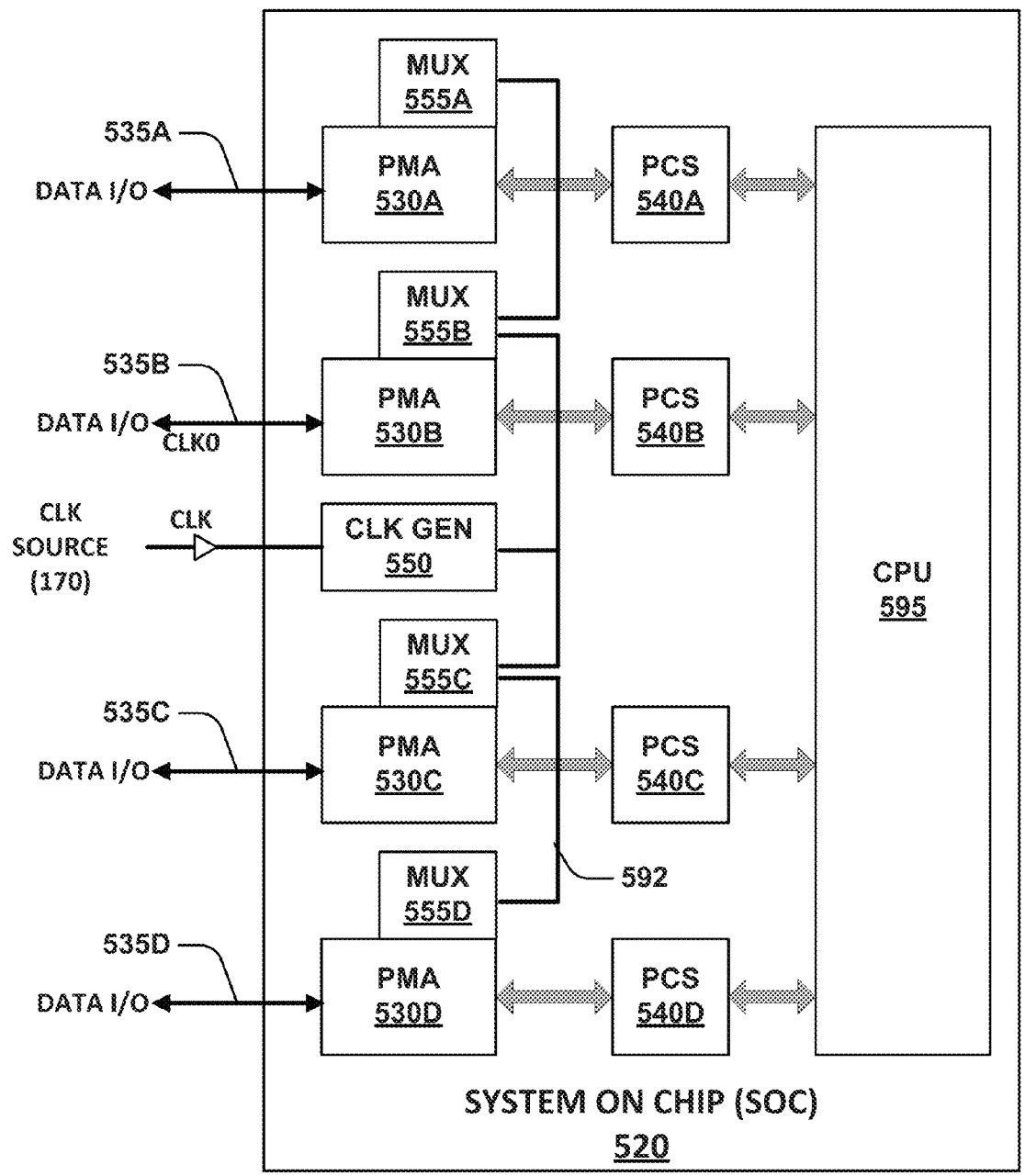
FIG. 5 is a block diagram of a SOC implementing a further embodiment of the invention.

FIG. 5 is a block diagram of a SOC 520 implementing a further embodiment of the invention. The components of the SOC 520 as shown may be only a portion of the entire SOC 520, which may include several other components as understood in the art. The SOC 520 may be configured, for example, as a component of a computer system 100 described above with reference to FIG. 1, and may communicate with external elements across a number of different communications protocols. To enable such communications, the SOC 520 may be configured in a manner similar to the SOC 220 described above with reference to FIG. 2. In particular, components of the SOC 520, including the PMAs 530A-C, MUX blocks 555A-D, PCSs 540A-D, CPU 595, clock bus 592, and data lines 535A-D, may be configured comparably to the components described above. The SOC 520 may be distinguished from the SOC 220 of FIG. 2 in that the clock generator 550 accepts a single external clock CLK and generates multiple different on-chip reference clocks to the clock bus 592 for use by the PMAs 530A-D. To accomplish this, the clock generator may include circuitry, such as phase-locked loops (PLLs), to generate the multiple reference clock signals. An example clock generator configured in this manner is described below with reference to FIG. 6.

Figure 6:
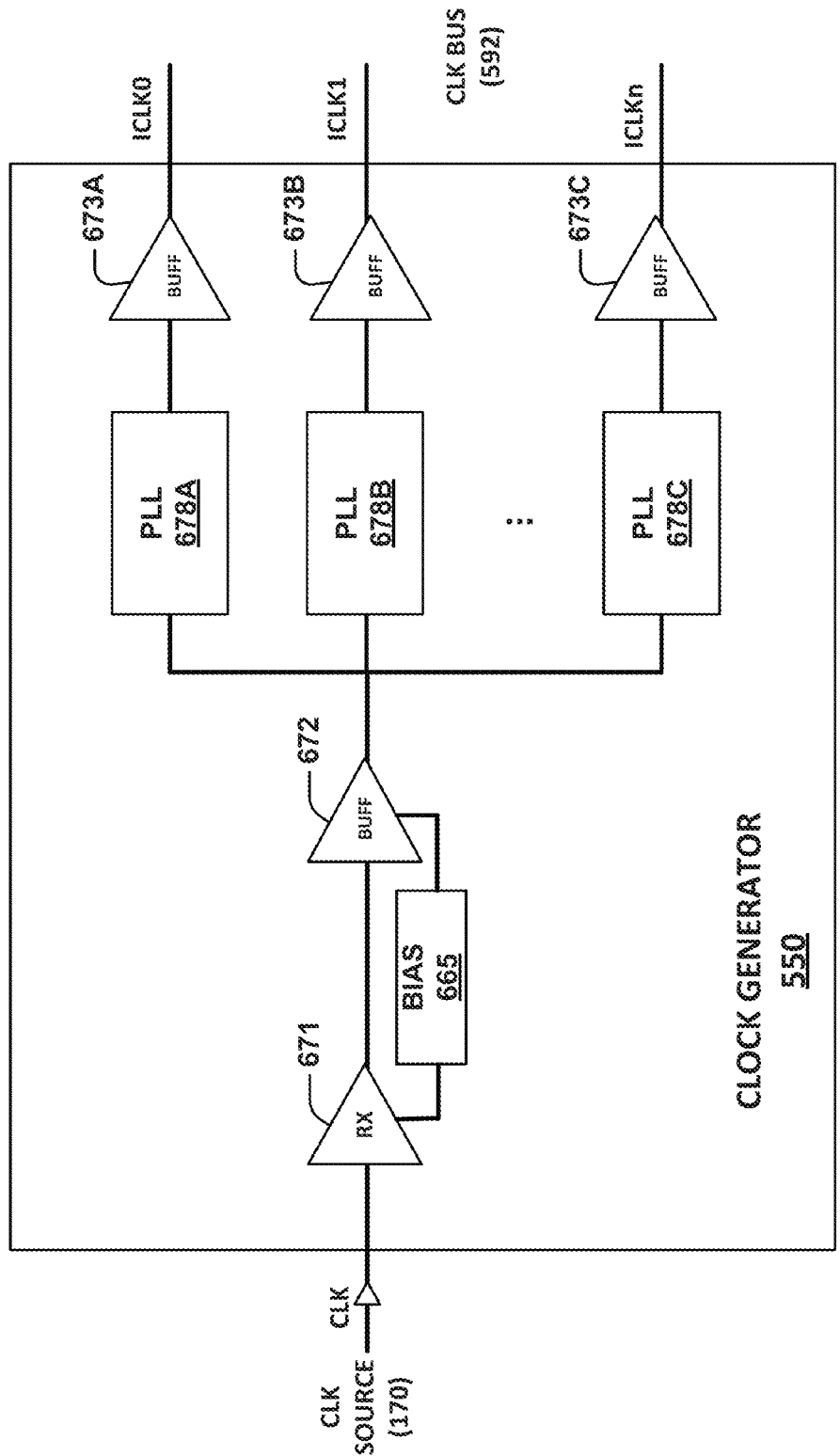
FIG. 6 is a circuit diagram of a clock generator in a further embodiment.

FIG. 6 is a circuit diagram of a clock generator 550 in a further embodiment, which may be implemented in the SOC 520 of FIG. 5. The clock generator 550 may accept the external clock signal CLK and generate multiple different on-chip reference clocks ICLK0-ICLKn for propagation on the clock bus 592. A receiver amplifier 671 receives the external clock signal CLK and forwards it to a buffer 672, both of which may be controlled by a bias circuit 665. A plurality of PLLs 678A-C receive the output of the buffer 672 in parallel. Each of the PLLs 678A-C may be configured to generate an output signal at a frequency distinct from one another and from the external clock CLK, as required for the PMA reference clocks. The PLLs 678A-C may accomplish this by dividing or multiplying the buffer 672 output. To facilitate this function, the external clock CLK may be generated at a frequency that is a multiple and/or denominator of each of the required reference clock frequencies. The outputs of each of the PLLs 678A-C are then forwarded to respective buffers 673A-C, which output the corresponding reference clocks ICLK0-ICLKn.

In the event that a reference clock matching a frequency of the external clock CLK is required, then the external clock CLK may be buffered and output in parallel as one of the reference clocks ICLK0-ICLKn, such as described above with reference to FIG. 3.

Figure 7:
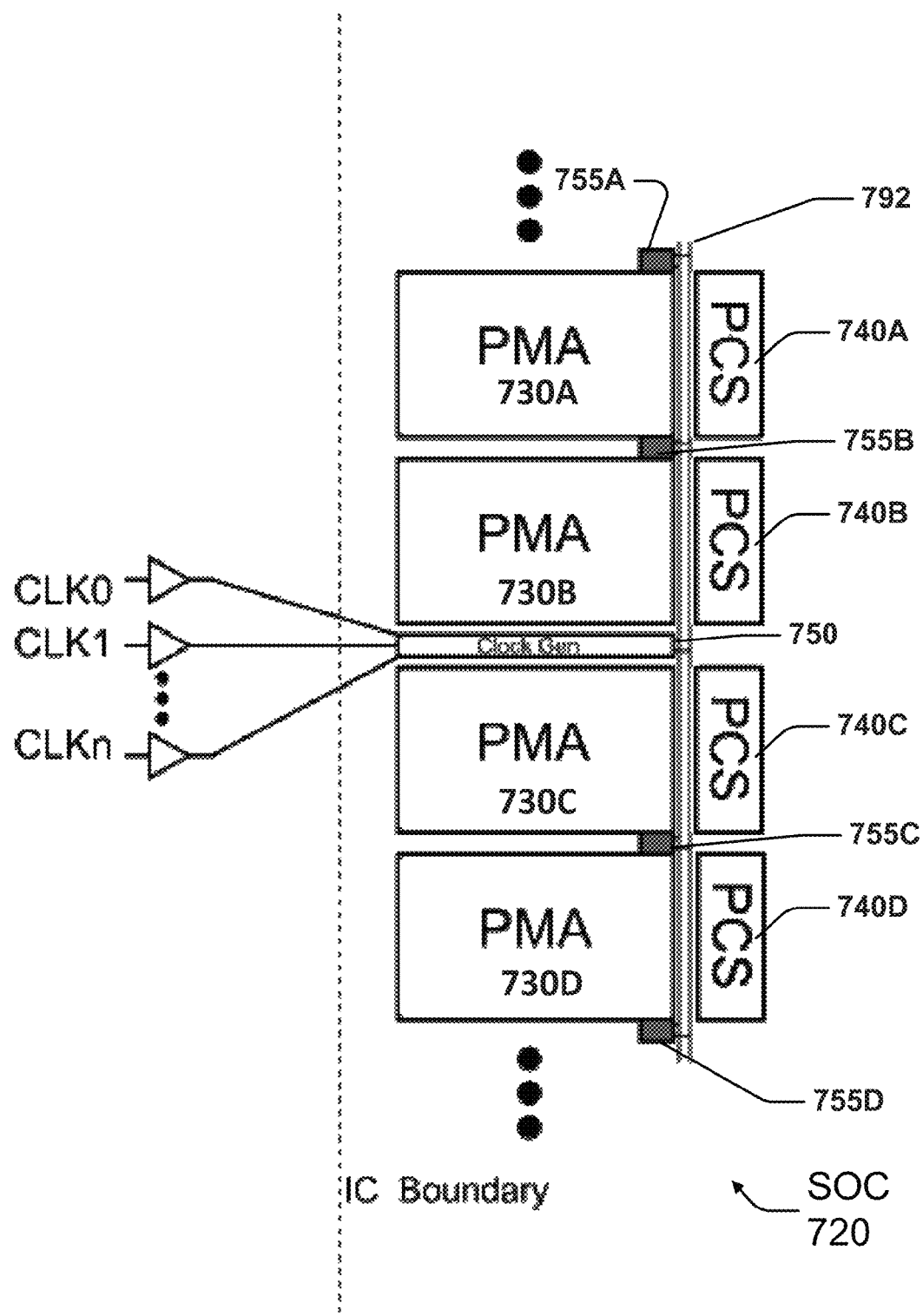
FIG. 7 is a diagram illustrating an integrated circuit (IC) layout of a SOC implementing one embodiment.

FIG. 7 is a diagram illustrating an integrated circuit (IC) layout of a SOC 720 in one embodiment. The SOC 520 may be configured, for example, as a component of a computer system 100 described above with reference to FIG. 1, and may communicate with external elements across a number of different communications protocols. To enable such communications, the SOC 520 may be configured in a manner similar to the SOCs 220, 520 described above with reference to FIGS. 2 and 5. In particular, components of the SOC 720, including the PMAs 730A-D, MUX blocks 755A-D, PCSs 740A-D, clock bus 792 and clock generator 750 may be configured comparably to the components described above.

In order to isolate noise between components, an IC layout may call for some separation between adjacent PMAs 730A-D and/or the PMA and PCS 740A-D. In these on-chip areas, which may otherwise be filled with spacer circuitry, the MUX blocks 755A-D, clock bus 792, and clock generator 750 may be implemented. As a result, embodiments of the invention can implement an on-chip reference clock network without requiring substantially additional space within an IC layout.

Figure 8:
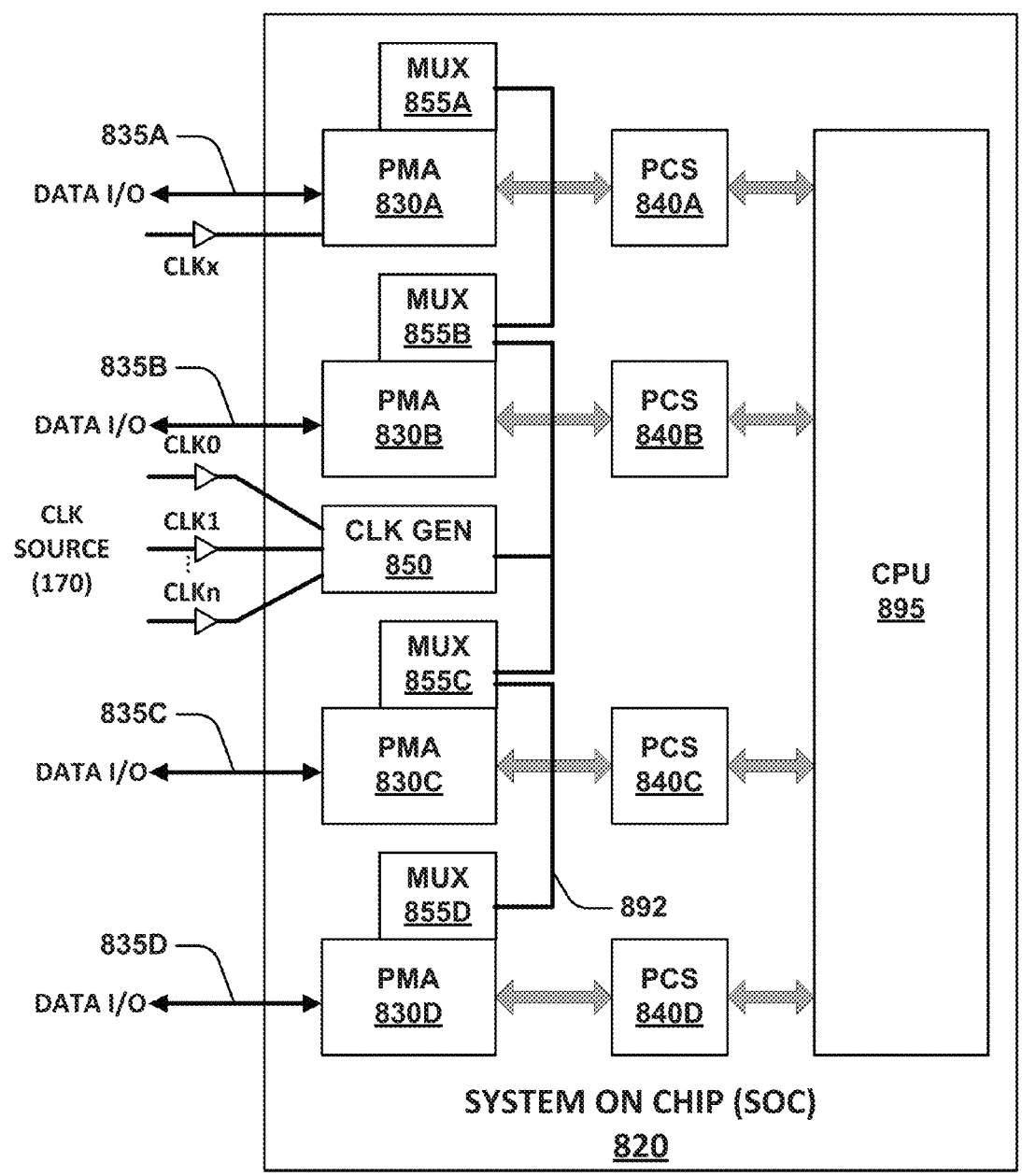
FIG. 8 is a block diagram of a SOC implementing a further embodiment.

FIG. 8 is a block diagram of a SOC implementing a further embodiment. The SOC 820 may be configured, for example, as a component of a computer system 100 described above with reference to FIG. 1, may be configured in a manner similar to the SOCs 220, 520 described above with reference to FIGS. 2 and 5. In particular, components of the SOC 720, including the PMAs 830A-C, MUX blocks 855A-D, PCSs 840A-D, CPU 895, clock bus 892, and data lines 835A-D, may be configured comparably to the components described above. In further embodiments, it may be beneficial to provide one or more of the PMAs 830A-D with an individual external clock signal. For example, PMA 830A may communicate under a distinct protocol that requires a distinct reference clock frequency. Rather than generate the needed reference clock at the clock generator, it may be more efficient to supply the reference clock CLKx directly to the PMA 830A via an external clock line.

In alternative embodiments, an SOC may implement features of any of the SOCs 220, 520, 820 in any combination. For example, a clock generator may accept one or several external clock inputs, and may generate some on-chip reference clocks by buffering an external clock, and may generate other on-chip reference clocks through one or more PLLs. Further, the PMAs may include 1) PMAs that are connected to an external clock line and isolated from an internal clock bus, 2) PMAs that are connected to the clock bus and isolated from any external clock line, and 3) PMAs that are connected to both an external clock line and the internal clock bus.

While this invention has been particularly shown and described with references to example embodiments thereof, it will be understood by those skilled in the art that various changes in form and details may be made therein without departing from the scope of the invention encompassed by the appended claims.

What is claimed is:

1. An integrated circuit comprising:
a clock generator connected to at least one clock line external to the integrated circuit, the clock generator being configured to receive at least one external clock signal at the at least one clock line and transmit a plurality of reference clock signals across a bus at the integrated circuit;
a plurality of physical medium attachments (PMAs) configured to interface with a respective input and output channel external to the integrated circuit;
a plurality of multiplexers connected to the bus, the plurality of multiplexers each configured to select among at least a subset of the plurality of reference clock signals to forward to at least one of the plurality of PMAs; and
a plurality of repeaters connected to buffer one of the plurality of reference clock signals to be forwarded to at least one of the plurality of multiplexers.

2. The integrated circuit of claim 1, wherein the clock generator generates the plurality of reference clock signals based on the at least one external clock signal.

3. The integrated circuit of claim 2, wherein the clock generator includes at least one buffer connected to buffer the at least one external clock signal to generate the plurality of reference clock signals.

4. The integrated circuit of claim 2, wherein at least one of the reference clock signals has a frequency distinct from another of the reference clock signals.

5. The integrated circuit of claim 2, wherein at least one of the reference clock signals has a frequency distinct from that of the at least one external clock signal.

6. The integrated circuit of claim 2, wherein the clock generator includes at least one phase-locked loop (PLL) connected to receive the at least one external clock signal, the at least one PLL configured to generate at least one of the reference clock signals having a frequency distinct from that of the at least one external clock signal.

7. The integrated circuit of claim 6, wherein the PLL generates the at least one of the reference clock signals at a frequency being an integer multiple of that of the at least one external clock signal.

8. The integrated circuit of claim 6, wherein the PLL generates the at least one of the reference clock signals at a frequency being a fractional multiple of that of the at least one external clock signal.

9. The integrated circuit of claim 1, wherein each of the plurality of PMAs is configured to clock data signals at the respective input and output channel with at least one of the plurality of reference clock signals.

10. The integrated circuit of claim 1, wherein each of the plurality of PMAs is configured to interface with a respective physical coding sublayer (PCS) with at least one of the plurality of reference clock signals.

11. The integrated circuit of claim 1, wherein the clock generator generates the plurality of reference clock signals according to communications protocols at each of the plurality of PMAs.

12. The integrated circuit of claim 1, wherein the plurality of PMAs are arranged in parallel along the bus, the plurality of multiplexers being positioned between the plurality of PMAs.

13. A method of providing reference clocks at an integrated circuit, comprising:
    receiving, at the integrated circuit, at least one clock signal from a clock line external to the integrated circuit;
    transmitting, at the integrated circuit, a plurality of reference clock signals across a bus, the plurality of reference clock signals being based on the at least one external clock signal;
    selecting among at least a subset of the plurality of reference clock signals to forward to at least one of a plurality of physical medium attachments (PMAs) at the integrated circuit, the plurality of PMAs being configured to interface with a respective input and output channel external to the integrated circuit; and
    buffering at least one of the plurality of reference clock signals to be forwarded to the plurality of PMAs.

14. The method of claim 13, further comprising generating, at the integrated circuit, the plurality of reference clock signals based on the at least one external clock signal.

15. The method of claim 14, wherein generating the plurality of reference clock signals includes buffering the at least one external clock signal.

16. The method of claim 14, wherein at least one of the reference clock signals has a frequency distinct from another of the reference clock signals.

17. The method of claim 14, wherein at least one of the reference clock signals has a frequency distinct from that of the at least one external clock signal.

18. The method of claim 14, further comprising controlling at least one phase-locked loop (PLL) at the integrated circuit to generate at least one of the reference clock signals having a frequency distinct from that of the at least one external clock signal.

19. The method of claim 18, wherein the frequency is an integer multiple of that of the at least one external clock signal.

20. The method of claim 18, wherein the frequency is a fractional multiple of that of the at least one external clock signal.

21. The method of claim 13, further comprising, in at least one of the PMAs, clocking data signals at the respective input and output channel with at least one of the plurality of reference clock signals.

22. The method of claim 13, wherein each of the plurality of PMAs is configured to interface with a respective physical coding sublayer (PCS) with at least one of the plurality of reference clock signals.

23. The method of claim 13, further comprising generating the plurality of reference clock signals according to communications protocols at each of the plurality of PMAs.

24. The method of claim 13, wherein the plurality of PMAs are arranged in parallel along the bus.

25. An integrated circuit comprising:
    a clock bus;
    a clock generator connected to at least one clock line external to the integrated circuit, the clock generator being configured to receive an external clock signal at the at least one clock line and generate, from the external clock signal, a plurality of reference clock signals having frequencies distinct from that of the external clock signal, the clock generator transmitting the plurality of reference clock signals across the clock bus;
    a plurality of multiplexers connected to the bus and at least one respective physical medium attachment (PMA), the plurality of multiplexers each configured to select among at least a subset of the plurality of reference clock signals to forward to the at least one respective PMA; and
    a plurality of repeaters connected to buffer one of the plurality of reference clock signals to be forwarded to at least one of the plurality of multiplexers via the clock bus.

* * * * *